United States Patent
Cheng et al.

(10) Patent No.: US 8,745,554 B2
(45) Date of Patent: Jun. 3, 2014

(54) PRACTICAL APPROACH TO LAYOUT MIGRATION

(75) Inventors: Ying-Chou Cheng, Zhubei (TW);
Tsong-Hua Ou, Taipei (TW); Josh J. H. Feng, Lotung (TW); Cheng-Lung Tsai, Hsin-Chu (TW); Ru-Gun Liu, Hsinchu (TW); Wen-Chun Huang, Xi-Gang Xiang (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 334 days.

(21) Appl. No.: 12/647,997

(22) Filed: Dec. 28, 2009

(65) Prior Publication Data

US 2011/0161907 A1 Jun. 30, 2011

(51) Int. Cl.
*G06F 17/50* (2006.01)
(52) U.S. Cl.
USPC ............................................. 716/55; 716/52
(58) Field of Classification Search
USPC .................................................... 716/50–55
See application file for complete search history.

(56) References Cited

U.S. PATENT DOCUMENTS

| | | | |
|---|---|---|---|
| 5,048,800 A | 9/1991 | Miyazaki et al. | |
| 5,440,478 A | 8/1995 | Fisher et al. | |
| 5,847,965 A | 12/1998 | Cheng | |
| 5,963,881 A | 10/1999 | Kahn et al. | |
| 6,028,991 A | 2/2000 | Akashi | |
| 6,045,619 A | 4/2000 | Tai et al. | |
| 6,077,310 A | 6/2000 | Yamamoto et al. | |
| 6,289,257 B1 | 9/2001 | Sekine | |
| 6,408,219 B2 | 6/2002 | Lamey, Jr. et al. | |
| 6,410,351 B1 | 6/2002 | Bode et al. | |
| 6,549,864 B1 | 4/2003 | Potyrailo | |
| 6,810,296 B2 | 10/2004 | Bode et al. | |
| 6,917,849 B1 | 7/2005 | Pasadyn et al. | |
| 6,968,253 B2 | 11/2005 | Mack et al. | |
| 6,980,873 B2 | 12/2005 | Shen | |
| 7,144,297 B2 | 12/2006 | Lin et al. | |
| 7,155,689 B2 * | 12/2006 | Pierrat et al. ..................... | 716/52 |
| 7,318,214 B1 * | 1/2008 | Prasad et al. ..................... | 716/53 |
| 7,360,191 B2 * | 4/2008 | Chang et al. .................. | 716/102 |
| 7,363,207 B2 | 4/2008 | Kamon | |
| 7,401,319 B2 * | 7/2008 | Horng et al. .................... | 716/53 |
| 7,783,999 B2 | 8/2010 | Ou et al. | |
| 7,904,845 B2 * | 3/2011 | Fouquet et al. ............... | 716/136 |

(Continued)

FOREIGN PATENT DOCUMENTS

CN 101266626 9/2008

OTHER PUBLICATIONS

Tian, Yuxin, et al., "Impact of Photolithography and Mask Variability on Interconnect Parasitics," 10 pages.

(Continued)

*Primary Examiner* — Binh Tat
(74) *Attorney, Agent, or Firm* — Haynes and Boone, LLP (57) ABSTRACT

The present disclosure provides an integrated circuit design method in many different embodiments. An exemplary IC design method comprises providing an IC design layout of a circuit in a first technology node; migrating the IC design layout of the circuit to a second technology node; applying an electrical patterning (ePatterning) modification to the migrated IC design layout according to an electrical parameter of the circuit; and thereafter fabricating a mask according to the migrated IC design layout of the circuit in the second technology node.

20 Claims, 5 Drawing Sheets

(56) References Cited

U.S. PATENT DOCUMENTS

| | | | |
|---|---|---|---|
| 8,001,494 | B2 | 8/2011 | Hou et al. |
| 8,037,575 | B2 | 10/2011 | Cheng et al. |
| 2004/0029299 | A1 | 2/2004 | Pasadyn et al. |
| 2004/0040001 | A1 | 2/2004 | Miller et al. |
| 2004/0093107 | A1 | 5/2004 | Good et al. |
| 2004/0181299 | A1 | 9/2004 | Yamazaki et al. |
| 2005/0007577 | A1 | 1/2005 | Engelhard et al. |
| 2005/0008227 | A1 | 1/2005 | Duan et al. |
| 2005/0021272 | A1 | 1/2005 | Jenkins et al. |
| 2005/0044514 | A1 | 2/2005 | Wu et al. |
| 2005/0120328 | A1 | 6/2005 | Seltmann et al. |
| 2005/0132306 | A1 | 6/2005 | Smith et al. |
| 2005/0188338 | A1* | 8/2005 | Kroyan et al. .............. 716/9 |
| 2005/0209820 | A1 | 9/2005 | Inoue et al. |
| 2005/0288812 | A1 | 12/2005 | Cheng et al. |
| 2006/0026539 | A1 | 2/2006 | Tetelbaum et al. |
| 2006/0048010 | A1 | 3/2006 | Tai et al. |
| 2006/0111804 | A1 | 5/2006 | Lin |
| 2006/0123380 | A1 | 6/2006 | Ikeuchi |
| 2006/0190876 | A1 | 8/2006 | Yamada |
| 2006/0282189 | A1 | 12/2006 | Akisawa et al. |
| 2007/0055892 | A1 | 3/2007 | Pikus |
| 2007/0101305 | A1 | 5/2007 | Smith et al. |
| 2007/0201442 | A1 | 8/2007 | Hekmatpour et al. |
| 2007/0234246 | A1 | 10/2007 | Sinha et al. |
| 2007/0265725 | A1 | 11/2007 | Liu et al. |
| 2007/0266356 | A1 | 11/2007 | Chang et al. |
| 2007/0266362 | A1 | 11/2007 | Lai et al. |
| 2007/0277134 | A1 | 11/2007 | Zhang et al. |
| 2007/0288219 | A1 | 12/2007 | Zafar et al. |
| 2008/0163140 | A1 | 7/2008 | Fouquet et al. |
| 2009/0070725 | A1 | 3/2009 | Yamada |
| 2009/0199151 | A1 | 8/2009 | Banerjee et al. |
| 2009/0326873 | A1* | 12/2009 | Wang et al. .............. 703/1 |
| 2011/0124193 | A1 | 5/2011 | Cheng et al. |

OTHER PUBLICATIONS

Zhou, Ying, et al., "A New Methodology for Interconnect Parasitics Extraction Considering Photo-Lithography effects," 6 pages.

U.S. Appl. No. 12/025,933, filed Feb. 5, 2008 by Francis Ko, Chih-Wei Lai, Kewei Zuo, Henry Lo, Jean Wang, Ping-hsu Chen, Chun-Hsien Lin, and Chen-Hua yu for "Novel Methodology to Realize Automatic Virtual metrology," 23 pages.

Cheng, Y.C., et al., "Patterning Effect and Correlated Electrical Model of Post-OPC MOSFET Devices," Proceeding of SPIE vol. 6521 65210G-1 to 65210G-9, 9 pages.

Ottesen, Craig, "Front Opening Pod (FOUP) Fire Protection: A General Overview," International Sematech, Nov. 5, 1999, 10 pages.

Chen, Kuah-Chou, et al., "Integrated Circuits Industry/Front-Opening Unified Pod Auto-Loading Structure," Knowledge Bridge, No. 22, Apr. 2002, 4 pages.

Chappell, Jeff, "The Future is the FOUP—company Business and Marking," Electronic News, Jul. 17, 2000, 2 pages.

Ouyang, Charles, et al., "An Analytical Model of Multiple ILD thickness Variation induced by Interaction of Layout Pattern and CMP Process," IEEE Transactions on Semiconductor Manufacturing, Aug. 2000, 7 pages.

Raghvendra, Srinivas, et al., "DFM: Linking Design and Manufacturing," Proceedings of the 18th International conference on VLSI Design held jointly with 4th International Conference on Embedded Systems Design, VLSID, 2005, 4 pages.

Tsuijikawa, Hiroyuki, et al., "Power=Supply Noise Reduction with Design for Manufacturability," IEICE Trans Fundamentals, vol. E88-A, No. 12, Dec. 2005, 8 pages.

Yue, H. H., et al., "Fault Detection of Plasma Etchers using Optical Emission Spectra," Aug. 2000, IEEE Transactions on Semiconductor Manufacturing, vol. 13, Issue 3, 12 pages.

Huang, Yi-Ting, et al., "Importance of Data Quality in Virtual metrology," IEEE Industrial Electronics, IECON 2006, 32nd Annual Conference, Nov. 6-10, 2006, 6 pages.

Chang, Yaw-Jen, et al., "Virtual Metrology Technique for Semiconductor Manufacturing," Neural Networks, 2006, IJCNN '06, International Joint conference Jul. 16-21, 2006, 5 pages.

Lin, Tung-Ho, et al., "A Virtual Metrology Scheme for Predicting CVD Thickness in Semiconductor Manufacturing," Robotics and Automation, ICRA Proceedings 2006, IEEE International Conference May 15-19, 2006, 6 pages.

Chinese Patent Office, Office Action dated Apr. 26, 2012, Application No. 201010230544.9, 8 pages.

* cited by examiner

PRACTICAL APPROACH TO LAYOUT MIGRATION

CROSS REFERENCE

The present disclosure is related to the following commonly-assigned U.S. patent applications, the entire disclosures of which are incorporated herein by reference: U.S. patent application Ser. No. 12/250,424 filed Oct. 13, 2008 by inventors Yung-Chin HOU, et al. for "TABLE-BASED DFM FOR ACCURATE POST-LAYOUT ANALYSIS"; and U.S. patent application Ser. No. 12/625,749, filed Nov. 25, 2009, by inventors Ying-Chou Cheng, et al. for "CUSTOMIZED PATTERNING MODULATION AND OPTIMIZATION".

BACKGROUND

The semiconductor integrated circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advances to be realized, similar developments in IC processing and manufacturing are needed.

For example, the performance of a chip design is seriously influenced by control of resistance/capacitance (RC), timing, leakage, and topology of the metal/dielectric inter-layers. In semiconductor fabrication, various processing modules are involved. Each module releases some representative information to a design model for follow-up work. Afterward, only a statistical corner can be added onto the simulation model for design reference. Such design flow lacks cross-team interaction, especially when the feature size is dramatically shrunken. Furthermore, in the current IC design flow, patterns used in simulation are too simple than the frequently designed patterns. The existing design method is challenged by various problems. For example, every module in current semiconductor processing modeling, such as lithography patterning, thin film deposition, etching, etc., is independent from other modules. The full chip tape out, as the final design product, cannot be achieved without maximized modeling efficiency. In another problem, the statistical corner is used for design reference and reduces the design flexibility and design margin. Further, if it is desired to use a design layout from a first technology node for fabricating devices of a second technology node, numerous interactions are required between a designer and semiconductor manufacturer.

Therefore, what is needed is a method and a system to provide effective and improved IC design for the advanced IC technologies.

SUMMARY

The present disclosure provides for many different embodiments. An exemplary IC design method comprises providing an IC design layout of a circuit in a first technology node; migrating the IC design layout of the circuit to a second technology node; applying an electrical patterning (ePatterning) modification to the migrated IC design layout according to an electrical parameter of the circuit; and thereafter fabricating a mask according to the migrated IC design layout of the circuit in the second technology node.

Another exemplary method includes providing an IC design layout in a first technology node; and performing a shrinking, gridding, and compacting process to the IC design layout, wherein the shrinking, gridding, and compacting process provides a migrated IC design layout in a second technology node. An optimization process may be performed to the migrated IC design layout to optimize various characteristics of the migrated IC design layout, wherein the various characteristics include electrical targets of the migrated IC design layout. It may be confirmed that the various characteristics of the migrated IC design layout in the second technology node match characteristics of the IC design layout in the first technology node.

Yet another exemplary method includes providing, by an IC designer, an original IC design layout in a first technology node. The method further includes converting the original design layout in the first technology node to a converted IC design layout in a second technology node, the converting being performed by a semiconductor manufacturer for making a semiconductor wafer according to the converted IC design layout. The semiconductor manufacturer can further perform a modification to a device feature defined in the converted IC design layout according to an electrical parameter of the device. Thereafter, a photomask can be made according to the converted and modified IC design layout, and a semiconductor wafer can be made using the photomask.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

It is understood that the following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In traditional IC processing and process control modeling, data is collected and tabularized by each module team. The final modeling is implemented by a design team, such as a SPICE team. Then, a statistical corner is provided to the design team for SPICE semi-empirical modeling. Currently, design technology processing progresses to design for manufacturability (DFM) or DFM methodology, which is an integration of manufacturing data and design procedure for better yield and design efficiency/reliability. Interaction and communication between a designer and manufacturer is enhanced by DFM methodology. DFM can be realized at various design stages with collaboration of design tool vendors. In an example, the manufacturer may be a semiconductor foundry; the designer may be an integrated circuit (IC) design house; and the design tool vendor may be an electronic design automation (EDA) tool vendor. The design in DFM methodology often involves transistor level simulation and requires the manufacturer to provide confidential manufacturing information to the designer. Furthermore, when the product is transferred from one fabrication site to another fabrication site or from one manufacturing technology to another manufacturing technology, the designer has to be involved in manufacturing information communication and designer/manufacturer interaction with extra effort/cost for redesigning.

The present disclosure provides an improved design methodology. The disclosed design methodology enhances communication among processing modules and design teams, achieving multi-object optimization according to product performance. Manufacturing information is fully utilized and an IC design layout is globally optimized for more specific processing recipes, processing models, and mask making technologies. First, in the disclosed design method, interaction between designing and wafer (and photomask) manufacturing occurs at an optical proximity correction (OPC) step that is implemented at the mask making module of the semiconductor manufacturer. The OPC step incorporates electrical performance parameters and optimization. Therefore, the disclosed method is also referred to as an electrical OPC pattering (also eOPC or ePatterning) technique. Second, ePatterning is different from traditional OPC. The OPC technique is designed for adding assistant features to and modifying the IC design layout to enhance optical resolution, thus only targeting optical performance, such as optical performance of a lithography process. In contrast, the ePatterning technique is designed for adding assistant features to and modifying the IC design layout to enhance electrical performance of an IC device to be formed, and additionally to enhance the optical performance, thus achieving multi-object optimization (e.g., optimizing optical performance and electrical performance). Third, during optimizing of a device's electrical performance, various processing deviations introduced from various processing modules are compensated for by tuning design layout of the device to achieve designed electrical performance of the device. For example, the design layout of a gate to a transistor is modified to reduce the electrical performance deviation arising from various manufacturing processes and optimize the electrical performance of the transistor, therefore providing a bridge and method to effectively communicate among the designing module and various manufacturing modules. The ePatterning method is further described below in detail through various embodiments.

The present disclosure implements the improved design methodology (that includes the ePatterning technique) to take an IC design layout (i.e., finished physical layout provided by the designer for example) and automatically convert it to another set of process design rules, enabling the layout to be fabricated in a new target process technology. This is often referred to as process migration, which can be used to migrate a design to the next technology node, enabling higher integration, smaller die size, higher performance, and better power consumption. Process migration can also be used to migrate a design to a different fabrication facility or foundry within the same technology node, for second sourcing, higher volume availability, or other business reasons.

Figure 1:
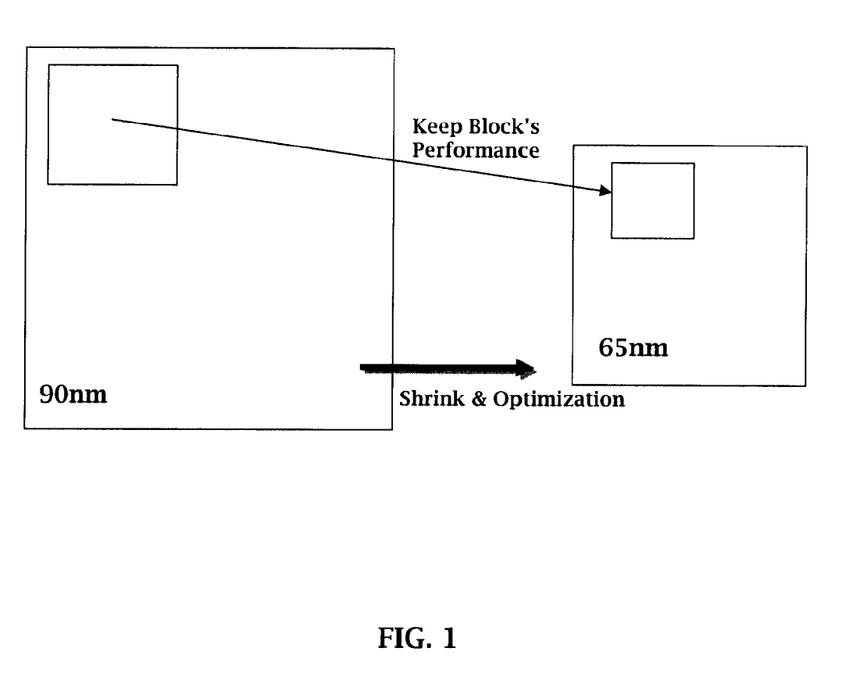
FIG. 1 is a block diagram illustrating an embodiment of an integrated circuit (IC) process migration according to aspects of the present disclosure.

FIG. 1 illustrates an exemplary process migration from a 90 nm technology node to a 65 nm technology node. The process migration involves shrinking the technology node and optimizing performance of the smaller technology node device. The technology node migration involves reusing and analyzing hard intellectual property (IP). In the present example, the hard IP provides a mask-level designed block in GDSII file format (or DFII file format). Other file formats are contemplated. Exemplary hard IP can include information about a mask, process specifications for fabricating the mask, and design rules.

During process migration, the hard IP file is modified and resized to have a smaller layout, which typically requires new process design rules. The technology node migration resizes each individual feature to meet timing and power constraints and produces an optimized and design-rule-correct layout. The resizing and optimization processes determine various changes that will be implemented for fabricating the smaller technology node device. Such changes (or modifications) include processes changes (e.g., material specifications, such as photoresist, intermetal dielectric, and interlevel dielectric material considerations; exposure parameters, such as exposure energies and times; focus considerations; implant process parameters including implant energies, timing, pressures, etc; anneal processing parameters; and/or other considerations); SPICE model changes (due to, for example, different device targets and behaviors); design flows (e.g., a new design flow may be proposed, which can increase the design complexity for a designer); optical proximity correction (OPC) dissection changes (e.g., a refined OPC recipe may be needed for the smaller technology node); foundry changes; and other changes. Deep submicron effects are also considered, since the impact of these effects increase as devices are further scaled down. In the present embodiment, as will be further discussed below, the resizing and optimization processes will utilize the ePatterning technique described herein, optimizing not only the IC design layout but also the optical and electrical parameters.

Figure 2:
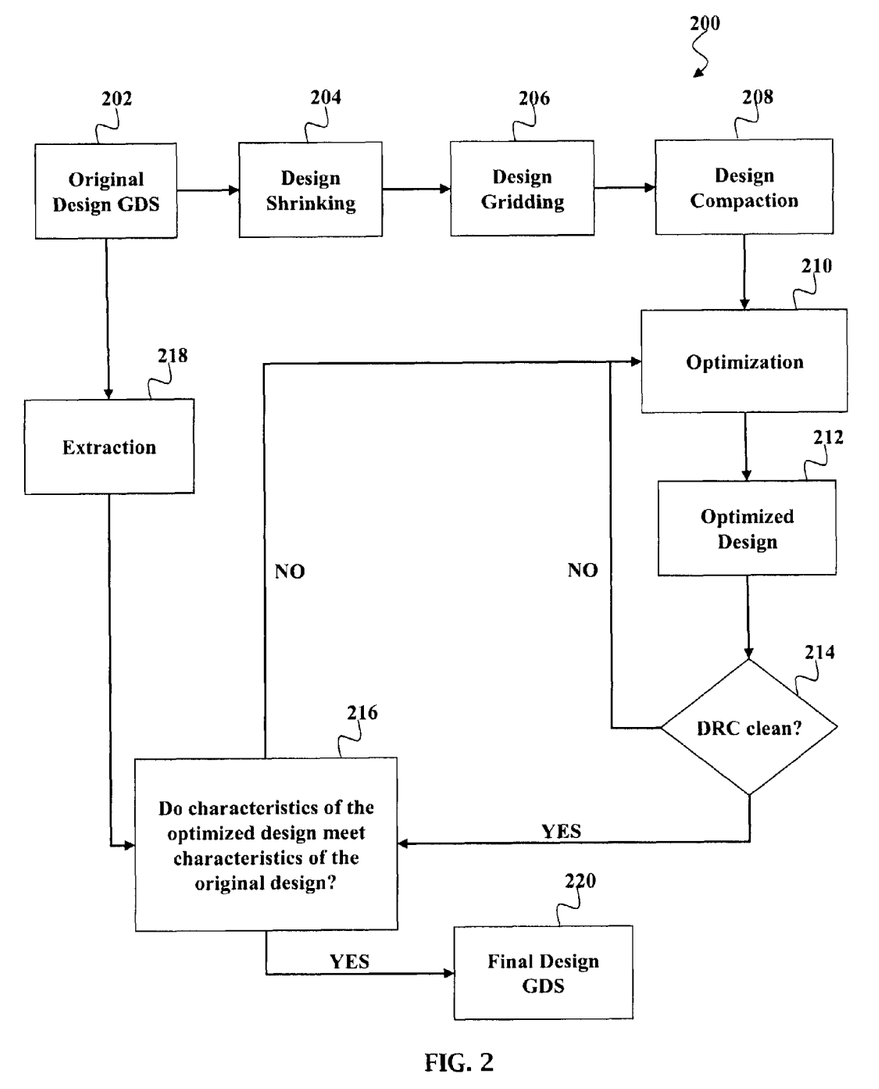
FIG. 2 is a flowchart of one embodiment of an integrated circuit (IC) design layout process migration flow according to aspects of the present disclosure.

FIG. 2 illustrates a simplified IC design layout migration flow 200 that can be implemented to shrink and optimize the 90 nm technology node device to the 65 nm node device shown in FIG. 1. As indicated in FIG. 1, performance of a block in the 90 nm technology node device needs to perform substantially the same as an identical block in the 65 nm technology node device. The layout migration flow 200 begins with an original design layout (GDS) 202, which reflects the design layout for a larger technology node device (e.g., the 90 nm technology node device). The original design (circuit) layout 202 may comprise a set of arranged geometric shapes, each shape made of a particular mask layer (e.g., polysilicon or different metal levels), to form devices (e.g., transistors, resistors, capacitors) present in a circuit device-level description. Each fabrication process includes its own set of mask layers and its own set of layout design rules, according to which all the IC's devices and interconnections must be laid out. In an example, a designer provides the original design layout 202 to a semiconductor manufacturer. In another example, the semiconductor manufacturer can pull the original design layout 202 from manufacturing data in a database of the semiconductor manufacturer.

The original design layout 202 then undergoes a design shrinking 204, a design gridding 206, and a design compaction 208. The design shrinking 204 includes considering rules for device sizing and routing. For example, design shrinking rules include a minimum width, length, and notch of each of the mask layers used to create the circuit devices as well as the routing wires. The design gridding 206 can include design grid rules, such as adjusting every single shape to a specified grid. The design compaction 208 can include design compaction rules, such as a minimum spacing, enclosure, extension, and overlap between a pair of mask layers.

By way of example and not limitation, a design layout for a 90 nm technology node device undergoes design shrinking 204, design gridding 206, and design compaction 208 to migrate to a design layout for a 65 nm technology node device. The migrated design layout may then undergo optimization 210. Optimization 210 implements an improved design methodology, incorporating the ePatterning technique, which will be described in further detail below. The improved design methodology implements performance based patterning optimization so that performance parameters (including optical and electrical parameters) of a final migrated design layout match performance parameters achieved by the original design layout.

The optimized design layout 212 may then be subjected to a design rule check (DRC) 214 process. The DRC technique can determine whether the physical layout of the optimized design layout 212 satisfies recommended parameters (or design rules). Design rules specify certain geometric and connectivity restrictions to ensure sufficient margins to account for variability in semiconductor manufacturing processes. Exemplary design rules include a width rule that specifies a minimum width of any shape in the design, a spacing rule that specifies a minimum distance between two adjacent objects, a two layer rule that specifies a relationship that must exist between two layers (e.g., an enclosure rule might specify that an object of one type, such as a contact or via, must be covered, with some additional margin, by a metal layer), a minimum area rule, other suitable rules, and/or combinations thereof.

If the optimized design layout does not meet the recommended parameters in the DRC 214, the optimized design layout 212 undergoes further optimization 210. If the optimized design layout 212 meets the recommended parameters provided in the DRC 214, then at block 216, the optimized design layout 212 is checked to determine whether the characteristics of the optimized design meet the characteristics of the original design. At block 218, the characteristics (or design information) of the original design layout 202 are extracted for comparison with the characteristics of the optimized design layout 212. The characteristics of the original design layout 202 may be extracted from manufacturing data, for example, stored in a database of a module of a semiconductor manufacturer.

The present disclosure, because of the ePatterning technique utilized, is able to verify and optimize design layout, optical performance parameters (targets), and electrical performance parameters (targets). In the present embodiment, electrical characteristics/targets extracted from an original design layout of a larger technology node device are compared to electrical characteristics/targets of an optimized, migrated design layout for a smaller technology node device. As noted above, the characteristics and performance of a block in the original design layout need to match the characteristics and performance of a corresponding block in the optimized, migrated design layout. If the performance parameters do not match, the optimized, migrated design layout may undergo further optimization 210. If the performance parameters match, then the optimized, migrated design layout 220 represents a final design layout 220. The final design layout 220 may be used in semiconductor fabrication or mask fabrication processes. Utilizing the ePatterning technique provides several benefits in design layout migration processes, including but not limited to: keeping major architecture of block level circuitry of the original design layout in the migrated design layout; maintaining device (and individual block) performance of the original design layout in the migrated design layout; providing a one-step physical and design awareness migration process without the need for cross-referencing design processes and multiple EDA tools from various vendors; providing a cost-effective approach to design layout migration; reducing run time for circuit level verification; integrating easily into current IC design and manufacturing processes; and/or various other benefits.

Figure 3:
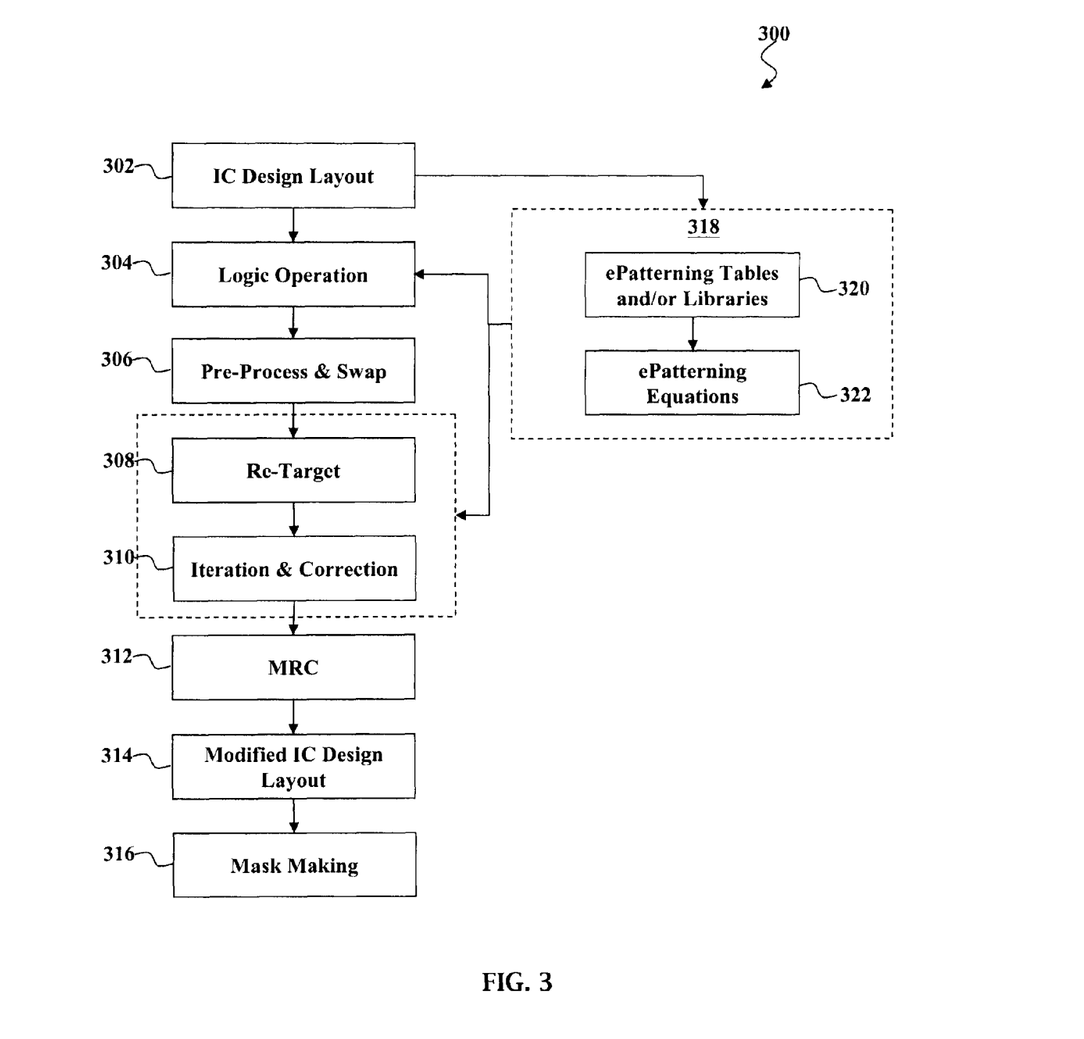
FIG. 3 is a flowchart of an embodiment of an integrated circuit (IC) design method according to aspects of the present disclosure.

FIG. 3 is a flowchart of a method 300 for IC design (or mask making) constructed according to various aspects of the present disclosure in one or more embodiments. In the present embodiment, the method 300 is a mask design or mask making method. The layout migration flow 200, described above with reference to FIG. 2, implements the method 300 to ensure that performance of the migrated technology node (e.g., 65 nm technology node) device matches the performance of the original technology node (e.g., 90 nm technology node) device. More particularly, the optimization method 300 ensures that the performance of a block in the migrated technology node performs substantially the same as an identical block in the original technology node device. It is understood that additional steps can be provided before, during, and after the method 300, and some of the steps described below can be replaced or eliminated for additional embodiments of the method.

The method 300 begins at block 302 by providing an IC design layout. A designer can provide the IC design layout. In an example, the designer is a design house or a design team that is separate from a semiconductor manufacturer (or IC fab) that is assigned to make IC product according to the IC design layout. In an example, the semiconductor manufacturer is a semiconductor foundry. The IC design layout includes various geometrical patterns designed for an IC product, based on a specification of the IC product. The IC design layout is presented in one or more data files having information of the geometrical patterns. For example, the IC design layout can be expressed in any suitable format, such as in GDS format. The IC design layout may be in a GDSII file format (or DFII file format).

The designer, based on the specification of the IC product to be manufactured, implements a proper design procedure to form the IC design layout. The design procedure may include logic design, physical design, and/or place and route. In an example, for illustration, a portion of the IC design layout includes various IC features, such as an active region, gate electrode, source and drain, metal lines or via of an interlayer interconnection, and openings for bonding pads, to be formed in a semiconductor substrate (such as a silicon wafer) and various material layers disposed on the semiconductor substrate. The IC design layout is then provided by the designer to the semiconductor manufacturer assigned or contracted for making the IC products according to the IC design layout.

Alternatively, the semiconductor manufacturer can pull the original design layout from manufacturing data in a database of the semiconductor manufacturer. For example, in the present embodiment, the IC design layout is a migrated design layout, for example, an original design layout of a larger technology node (e.g., 90 nm) that has undergone process migration (design shrinking, gridding, and compaction) to achieve the migrated design layout for a smaller technology node (e.g., 65 nm).

At block 304, the method 300 performs a logic operation (or LOP) to the IC design layout. The logic operation modifies the IC design layout according to manufacturing rules. In the present embodiment, the logic operation is performed by the semiconductor manufacturer. Various manufacturer modules convert manufacturing constraints into a set of rules that the IC design layout has to meet. If the IC design layout does not meet this set of rules, the IC design layout will be modified accordingly until the modified IC design layout meets these rules. Such modification is implemented by the logic operation.

At block 306, the method 300 performs a pre-process and swap process. During the pre-process and swap process, the geometrical patterns in the IC design layout are divided, matched, and replaced for repetitive blocks of the IC design layout, such that the IC design layout is simplified for further processing. For example, in order to reduce process costs and time with enhanced efficiency, a repetitive pattern is replaced such that any further modification to the repetitive pattern will not be repeated for each repetitive pattern. If a repetitive pattern appears in various designs, it can be extracted into a database or library for future use. In this case, the repetitive pattern is replaced by a standard pattern in a library.

At block 308, a re-targeting process is performed to the IC design layout. In this step, various optical proximity correction (OPC) features, such as scattering bars, serif, and/or hammerheads, are added to the IC design layout. Various OPC features (and/or bias) is added or repositioned according to an optical model or rules such that, after a lithography process, a final pattern on a wafer is improved with enhanced resolution and precision. Furthermore, as will be discussed further below, the re-targeting process not only incorporates regular OPC features but also incorporates ePatterning features to the IC design layout to enhance both optical performance and electrical performance for multi-object optimization.

At block 310, the method 300 performs an iteration and correction process to the IC design pattern. The process of adding the OPC features and eOPC features can be iterated and enhanced at this step until the formed IC design layout can achieve high resolution or meet expected criteria based on the final pattern to be formed in the wafer. Here, the iteration and correction process may be implemented according to a simulation result, such as proximity effect by simulation. For example, the IC design layout is tuned according to simulated wafer results by lithography processes and/or etching processes. In an example, the simulation takes manufacturing data from the semiconductor manufacturer, such as data from the lithography exposing process and/or etching process, as inputs and provides a virtual developed resist pattern or etched pattern as output. Various features of the IC design layout, such as added OPC and ePatterning features, may be repositioned or resized for manufacturing benefits and/or product performance improvement, such as lithography resolution enhancement. Additionally or alternatively, other features may be added or other actions may be applied to the IC design layout. For example, dummy insertion features may be added to the IC design layout for enhanced chemical mechanical polishing (CMP) or other processing advantages.

At block 312, a mask rule check (MRC) may be performed on the IC design layout. This involves further checking the IC design layout according to mask rules and modifying the IC design layout if needed. For example, the mask rules in the MRC process are extracted from a mask fabrication module, such as a mask shop. The mask fabrication module may be a part of the semiconductor manufacturer. Various mask making data are collected from the mask fabrication module and extracted into a set of rules that the IC design layout, as a pattern to be imaged to a mask, should follow. Additionally or alternatively, the mask rules or a subset of the mask rules are used as a guideline to tune the IC design layout. The MRC process may also or alternatively implement a design rule check (DRC) process, such as that described with reference to FIG. 2 and DRC process 214.

At block 314, the method 300 may modify the IC design layout to provide a modified IC design layout in a format accessible by a mask making tool. An exemplary modified IC design layout is expressed in a GDS format. If the method 300 is implemented into the IC design layout migration flow 200, then characteristics of the modified IC design layout would be compared to characteristics of the original IC design layout. Particularly, a check of the electrical parameters is performed.

Then, at block 316, a mask or group of masks are fabricated based on the IC design layout. For example, an electron-beam (e-beam) or a mechanism of multiple e-beams is used to form a pattern on a mask (photomask or reticle) based on the IC design layout. The mask can be formed in various technologies. In one embodiment, the mask is formed using binary technology. In the present embodiment, a mask pattern includes opaque regions and transparent regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM known in the art.

Other processing steps may follow after the formation of the mask. In the present embodiment, a semiconductor wafer is fabricated using the mask formed by the above method. The semiconductor wafer includes a silicon substrate or other proper substrate having material layers formed thereon. Other proper substrate materials include a suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects (or formed at subsequent manufacturing steps). The mask may be used in a variety of processes. For example, the mask may be used in an ion implantation process to form various doped regions in the semiconductor wafer, in an etching process to formed various etching regions in the semiconductor wafer, in a deposition process (e.g., chemical vapor deposition (CVD) or physical vapor deposition (PVD)) to form a thin film in various regions on the semiconductor wafer, and/or other suitable processes.

Various manufacturing data may be collected from various manufacturing processes including CVD, PVD, etching, ion implantation, and lithography processes from the previously processed semiconductor wafers, processing tools, and metrology tools.

The method 300 further employs an IC design database 318 to simplify and improve IC design. The IC design database 318 includes ePatterning tables and/or ePatterning libraries 320 to provide standard ePatterning tables and/or libraries for IC design that may be implemented by the method 300. The IC design database 318 additionally includes a mechanism to extract the relevant data from the ePatterning tables and/or libraries 320 for the IC design layout. The ePatterning tables 320 include tables built to bridge the IC design layout and wafer processing results (in some cases, mask processing results). In an embodiment, the IC design database 318 additionally includes ePatterning equations 322 used for IC design that may be implemented by the method 300.

In the present embodiment, the manufacturing data is used to simulate wafer processing results that include optical results and electrical results. The wafer processing results (including optical results and electrical results) is fed back to blocks 308 and 310, for re-targeting processes and for iteration/corrections, modifying the IC design layout by incorporating OPC and ePatterning features into the IC design layout. This allows interaction among the IC designer and various manufacturing modules to be effectively implemented in the semiconductor manufacturer (such as steps 308 and 310), making this process transparent to the IC designer. In some embodiments, the wafer simulation result is simplified to a procedure that involves checking the ePatterning tables based on the IC design layout for corresponding wafer results. For example, when a transistor (e.g., complementary metal-oxide-semiconductor (CMOS) transistor) is simulated for optical results and electrical results based on geometries of a gate electrode and an active region, corresponding geometries are converted to a simplified geometry, such as a rectangle, for which the simulated optical and electrical results can be determined from the ePatterning tables. Particularly, the optical results, such as the contours of the gate electrode and the active region, can be obtained from a simulation using the manufacturing data, such as data from lithography processes and/or etching processes.

The ePatterning libraries are used similarly to provide simulated results for a transistor and/or other features. The transistor or other features repetitively appearing in various IC design layouts can be preprocessed and accumulated in the ePatterning library for use. In one embodiment, at block 302, the IC design layout is processed to extract any representative feature. This representative feature can be found in previous IC design layouts, so simulation of the representative features are simplified based on the tables and/or libraries. In an example, if the representative feature will potentially occur in a future IC design layout, the representative feature will be extracted from the IC design layout and preprocessed once, saved in the ePatterning tables/libraries, and reused in this and other future IC design layouts for efficiency. In another example, at block 302, the IC design layout is provided to ePatterning database to extract the representative features and match some features of the IC design layout to the existing representative features in the ePatterning database 318, such as matching to the ePatterning tables/libraries. Furthermore, the electrical results (e.g., electrical performance of the transistor) is further determined by simulating the transistor based on the contour of the gate electrode and the active region.

In an exemplary transistor embodiment, a transistor channel is defined as an overlap region between the gate electrode and active region. More particularly, a channel contour is defined as an overlap region between contours of the gate electrode and the active region. The channel contour can be simulated using a simulation tool for its electrical parameters, such as saturation current, leakage current, and threshold voltage. The channel contour can be simplified into an effective geometry, such as an effective rectangle. The simulation is applied to the effective geometry for efficiency. The contour of the channel can also be generated from the IC design layout by simulation and then the effective rectangle is generated from the channel contour based on a procedure aimed to simplify the geometry of that feature (such as the channel) with effectiveness and precision. Such a procedure may implement the method described in U.S. patent application Ser. No. 12/250,424 filed Oct. 13, 2008 by inventors Yung-Chin HOU, et al., entitled "TABLE-BASED DFM FOR ACCURATE POST-LAYOUT ANALYSIS". In an example, the effective rectangle is a geometry that can be simulated for the electrical performance effectively and more efficiently by a SPICE tool or other suitable simulation tool.

Accordingly, an ePatterning design stage (such as blocks 308 and 310) is used in the present disclosure that incorporates not only traditional OPC features but also other additional modifications/features into the IC design layout. These additional modifications/features are referred to as ePatterning modifications/features that are applied to or added to the IC design layout. These additional modifications/features include, but are not limited to, modifications/features of tunable features (such as the channel). The features can be targeted to tune final electrical performance and additionally include dummy insertion features for enhanced CMP processing. The ePatterning modifications/features are applied or added to the IC design layout either through model-based and/or rule-based procedures.

For illustration purposes, generating the effective rectangle is explained in detail. First, find a maximum rectangle inside the channel contour of the transistor in the IC layout contour defined by the associated gate electrode contour and active region contour. Then, find a width correction to the maximum rectangle according to a difference between the channel contour and the maximum rectangle. Similarly, find a length correction to the maximum rectangle according to a difference between the channel contour and the maximum rectangle. In an embodiment, an equivalent width of the channel is the width of the maximum rectangle plus the width correction, and an equivalent length is the length of the maximum rectangle plus the length correction.

Then, for device performance evaluation, the effective geometry to the corresponding feature (e.g., the channel) in the IC design layout is provided to the simulation tool (e.g., SPICE) for electrical parameters of the transistor. The electrical parameters include saturation current, leakage current, and threshold voltage of the transistor. For better understanding, the simulation applied to the IC design layout to generate the contour based on the manufacturing data is also referred to as a first simulation (or optical simulation). The simulation applied to the contour (or simplified geometry) to generate the electrical parameters is also referred to as a second simulation (or electrical simulation). Thus, the electrical parameters of the transistor are obtained based on the contour of the channel by the electrical simulation, wherein the contour is determined based on the IC design layout and the manufacturing data by the optical simulation. By these two type of simulations, the electrical parameters of the device (such as a transistor) is associated with the IC design layout.

Similarly, the changes to the IC design layout are also associated with the changes of the electrical parameters through the simulations (the optical simulation and the electrical simulation). Such associations can be used to modify the IC design layout for optimized or improved electrical performance. Furthermore, such associations can be quantitatively expressed in equations, referred to as ePatterning equations 322 and saved in the ePatterning database 318. In an example, each ePatterning equation represents a mathematical relationship between the effective geometry and the electrical parameter. Thereby, the electrical simulation can be simplified to extract the electrical results from the ePatterning equations. In another example, each ePatterning equation represents a mathematical relationship between the geometry of the feature in the IC design layout and the electrical parameter of the corresponding device.

In the present embodiment, both optical simulation and electrical simulation are simplified to extract the electrical results from the ePatterning equations. In either case, the ePatterning modifications/features applied or added to the IC design layout can be simplified by applying the ePatterning equations or additionally checking the ePatterning tables/libraries. In one example, a certain width and length of the channel in the IC design layout is associated with a certain saturation current of the corresponding transistor. In furtherance of the example, a certain width/length change to the channel in the IC design layout is associated with a certain change to the saturation current. If the saturation current does not meet the specification, based on the ePatterning equations, it is easy to determine what changes to apply to the channel of the transistor in the IC design layout to tune the saturation current into a range predefined in the specification. Similarly, the leakage current or threshold voltage can also be expressed in an ePatterning equations.

As noted above, the IC design layout can be modified and fine-tuned based on the manufacturing data at blocks 308 and 310, wherein the modifications/features are applied to or added to the IC design layout. Thus, the re-targeting process at block 308 and/or the iteration/correction process at block 310 can be implemented based on output from the ePatterning database 318. The simulation result of a device feature (such as the channel) can be directly obtained from the ePatterning equation without going through time-consuming simulation. The time-consuming simulation can be avoided to achieve short design time and cost-effectiveness. For example, the re-targeting process 308 is implemented based on the simulated electrical performance of the targeted feature directly from the ePatterning database 318.

At least some of the advantages and benefits described below may be present in various embodiments of the disclosed method for IC designing, including mask making and wafer fabrication. For one, the disclosed method allows the designer to focus on IC design without the burden of considering manufacturing capability and tuning of the IC design according to manufacturing information. Instead, the semiconductor manufacturing side can modify and fine-tune the IC design according to manufacturing data at regular OPC steps by adding the ePatterning technique and features described herein. Therefore, manufacturing data is distributed inside the semiconductor manufacturer, allowing manufacturing information and trade secrets to remain confidential. Further, when an IC product in the semiconductor manufacturer is to be transferred from one product line to a different product line or different manufacturing technology (for example, migrating the IC design from a first technology node to a second technology node), the designer is not necessarily involved in having to redesign the existing product according to new manufacturing information. The semiconductor manufacturer can independently redesign the IC design layout using the disclosed method 300 by modifying or fine-tuning the IC design layout according to new manufacturing data from the newly assigned product line or semiconductor technology. Accordingly, the new ePatterning database, including ePatterning tables, libraries, and equations, is accumulatively built in a pre-processing procedure based on experimental data and production data from a corresponding product line or semiconductor technology. Furthermore, the IC design is tuned not only according to the imaged pattern on the semiconductor wafer but also the electrical parameters or device performance of a final device formed on the semiconductor wafer. Both the optical target (imaged pattern on the wafer by a lithography process) and electrical target (device performance) are accomplished through the IC design tuning at the stage where the ePatterning features are implemented.

In some examples, the IC design layout is not tuned to the targeted pattern according to the original IC design layout provided by the designer using OPC features. Instead, it is tuned to the electrical target for optimized performance according to the specification of the integrated circuit provided by the designer using the ePatterning technique described herein. For example, when tuning the IC design layout, the pattern of a gate electrode to be formed on the semiconductor wafer is not tuned to the IC design layout provided by the designer. Instead, the pattern of the gate electrode (or active region) is tuned using the ePatterning technique so that saturation current is optimized and leakage current is minimized. In various embodiments, the ePatterning technique includes assistant features, such as scattering bars, serifs, and hammerheads, which can be used not only for optical resolution enhancement but also for circuit performance enhancement. Moreover, the ePatterning technique includes other modifications to the IC design layout, such as resizing, repositioning, and adjusting a border of a feature in the IC design layout. By implementing the modification to the IC design layout at the OPC stage, the disclosed ePatterning method, which targets for optimized performance (or optimized electrical parameters), can effectively coordinate all processing modules in a way that the modified IC design layout reflects feedbacks of manufacturing data from all the processing modules, even including test data from a test module, such as test data from a probe test for device electrical performance. Thus, the IC design layout, optical target (for IC patterning), and electrical target (for electrical performance) all effectively interact through the ePatterning technique in the disclosed method 300 to provide an optimized IC design layout, optical targets, and electrical targets.

In an example, the IC design database 318 is used to modify the IC design layout such that the corresponding integrated circuit formed on a wafer by a semiconductor manufacturer has an improved or optimized electrical performance because the IC design layout is tuned specifically to the semiconductor manufacturer. The ePatterning database is built up based on manufacturing data from the semiconductor manufacturer. The method 300 provides a mechanism to extract data from the ePatterning tables and/or ePatterning libraries 320 and apply the extracted data to the IC design layout for modification or adding new features. The manufacturing data from the various processing modules is used to simulate the wafer processing result and optimize the IC design for electrical performance. The interaction and coordination between the IC designer and manufacture modules is implemented at the ePatterning stage inside the manufacturer so that this process is transparent to the IC designer. Various wafer simulation results are represented by the ePatterning tables or libraries. Thus, the procedure of modifying and/or adding new features to the IC design layout is simplified to look up the ePatterning tables for libraries. As a result of the method, the designer is freed from dealing with manufacturing details of a particular semiconductor manufacturer.

The ePatterning modifications/features can be achieved based on rules (therefore rule-based) or based on models (therefore model-based) or combination thereof. In the rule-based ePatterning, the IC design layout is modified at block 304 by the logic operation process according to the ePatterning tables/libraries 320 and/or ePatterning equations. For example, various rules can be extracted from the manufacturing data and simulations saved in the ePatterning database. The logic operation can apply these rules to modify the IC design layout to improve the electrical performance of the device in the IC design layout. By implementing the method 300, the ePatterning designing is compatible with and fits in the OPC operation flow, driven by electrical performance of the devices to be formed on wafers based on the IC design layout. The IC design layout can be modified before, during, and after the regular OPC operation according to the electrical impacts. In an embodiment, the ePatterning modifications/features applied to or added to the IC design layout can be implemented in an OPC tool. By implementing the ePatterning designing in the OPC tool, the design tuning operation is cost-effective and efficient.

The process from blocks 304 to 310 can be implemented to the IC design layout through more than one cycle until predefined criteria are met. For example, if a leakage current is less than a value defined in a production specification, the IC design layout is modified at the logic operation process of block 304 based on the ePatterning tables/libraries/equations 320, 322 and then proceeds to the retargeting and iteration/correction processes of blocks 308 and 310. Thereafter, the IC design layout is verified by predefined criteria if further logic operation and retargeting are needed. If the IC design layout passes the criteria, the method 300 will proceed to the MRC process at block 312. Otherwise, the method 300 will return to block 304 to repeat blocks 304 to 310 to further tune the IC design layout until the criteria are met.

Figure 4:
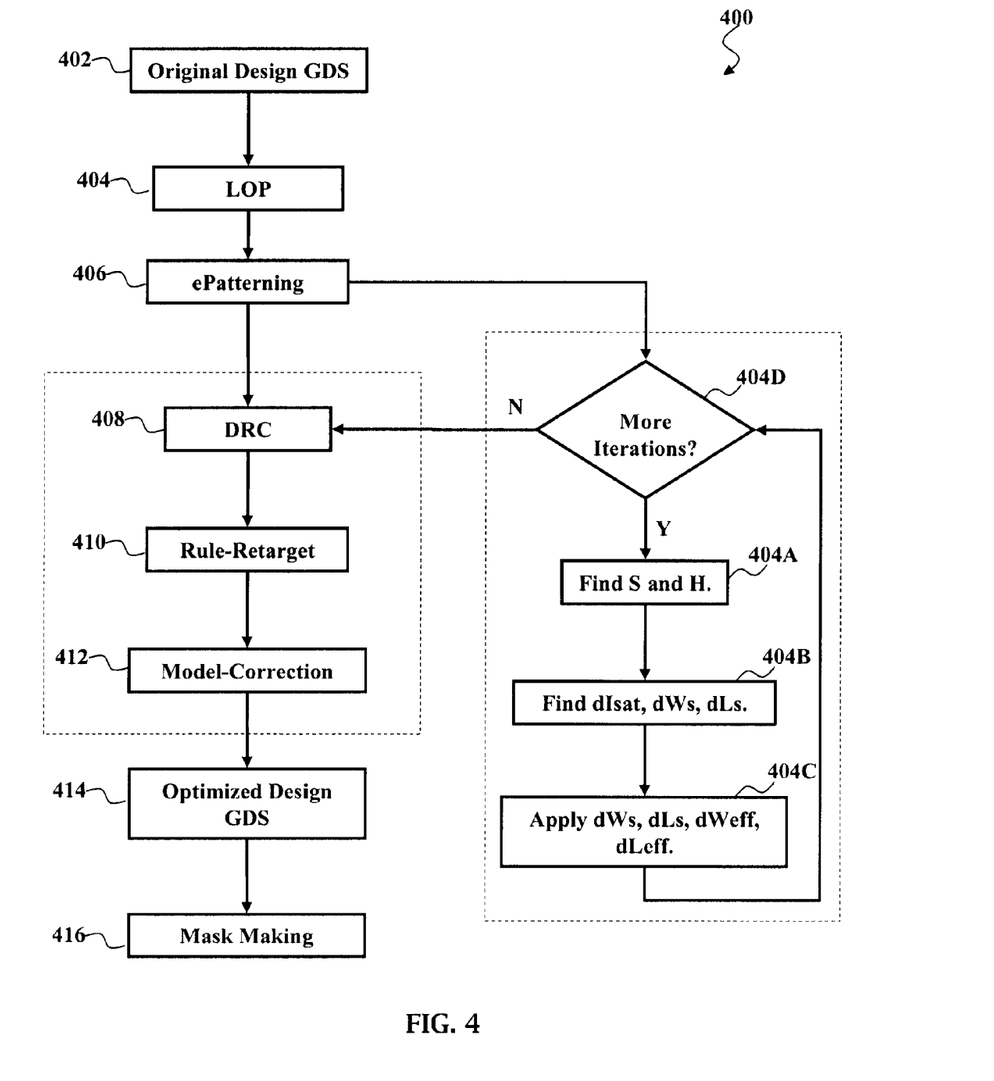
FIG. 4 is a flowchart of an embodiment of an integrated circuit (IC) design method according to aspects of the present disclosure.

FIG. 4 is a flowchart of a method 400 for IC design constructed according to aspects of the present disclosure. The layout migration flow 200, described above with reference to FIG. 2, can implement the method 400 to ensure that performance of the migrated technology node (e.g., 65 nm technology node) device matches the performance of the original technology node (e.g., 90 nm technology node) device. More particularly, the optimization method 400 ensures that the performance of a block in the migrated technology node performs substantially the same as an identical block in the original technology node device. Aspects of the method 400 are similar to method 300. It is understood that additional steps can be provided before, during, and after the method 400, and some of the steps described below can be replaced or eliminated for additional embodiments of the method.

The method 400 begins at block 402 by providing an original design layout. A designer can provide the IC design layout. In an example, the designer is a design house or a design team that is separate from a semiconductor manufacturer (or IC fab) that is assigned to make IC product according to the IC design layout. In an example, the semiconductor manufacturer is a semiconductor foundry. The IC design layout includes various geometrical patterns designed for an IC product, based on a specification of the IC product. The IC design layout is presented in one or more data files having information of the geometrical patterns. For example, the IC design layout can be expressed any suitable format, such as in gds format. The IC design layout may be in a GDSII file format (or DFII file format).

At block 404, a logic operation (LOP) is performed to the IC design layout. The logic operation modifies the IC design layout according to manufacturing rules. In the present embodiment, the logic operation is performed by the semiconductor manufacturer. Various manufacturer modules convert manufacturing constraints into a set of rules that the IC design layout has to meet. If the IC design layout does not meet these rules, the IC design layout will be modified accordingly. Such modification is implemented at this step by the logic operation.

At block 406, an ePatterning technique (e-OPC technique) as described herein is implemented. An OPC technique can also be implemented. Here, various modifications are applied to the IC design layout. These modifications are based on manufacturing data provided by a variety of processing modules in a semiconductor manufacturer, which typically have been assigned to make integrated circuit devices on semiconductor wafers according to the IC design layout (or make a mask on a substrate according to the IC design layout). The processing modules include, as representative examples, ion plantation, etching, chemical vapor deposition, physical vapor deposition, atomic layer deposition, epitaxy growth, lithography, and thermal oxidation modules. Other processing modules are contemplated. The modifications to the IC design layout include adding new features, resizing features, repositioning an existing feature, and/or changing the border line of an existing feature. As described above, OPC is designed for adding assistant features to and modifying the IC design layout to enhance optical resolution. ePatterning is designed for adding assistant features to and modifying the IC design layout to enhance electrical performance. The ePatterning technique may incorporate the OPC function such that the ePatterning can add assistant features to and modify the IC design layout to enhance the optical resolution and improve electrical performance as well.

The ePatterning 406 may be implemented by various sub-steps as further described below. In the present embodiment, ePatterning 406 implements sub-steps 404A, 404B, 404C, 404D. At block 404A, ePatterning 206 can generate gates. For example, the IC design layout includes one or more transistors, such as metal-oxide-semiconductor (MOS) transistors. Each transistor includes a gate defined on a channel, which is designed to control the channel. Each gate includes a gate dielectric and a gate electrode positioned on the gate dielectric. Based on manufacturing data from the semiconductor manufacturer, a simulation process is applied to the gate to generate a corresponding gate contour. The gate contour, also referred to as ePatterning (or ePatterning) contour, represents a geometry and dimensions of the gate manufactured by the associated semiconductor manufacturer. Similarly, the contour of the active region is also generated. The channel contour is therefore generated as an overlap region between the contours of the gate and the active region. Block 404A can further include finding geometrical parameters, such as spacing S and height H. For illustration, the active region includes a first segment perpendicular to the gate and overlapped with the gate. The active region also includes a second segment connected to the first segment, spaced away from the gate, and extended in a direction parallel to the gate. The spacing S represents a spacing between the gate and the second segment of the active region. The height H represents a dimension of the second segment of the active region in the direction parallel to the gate. The gate contour and geometrical parameters can be found by a simulation process.

At block 404B, the ePatterning 206 can calculate various changes of electrical parameters and corresponding changes of the geometrical parameters (or geometrical changes) to the channel in the IC design layout. A geometrical change represents a relative change to the original value of the geometrical parameter of the IC design layout. Examples of geometrical parameters of the IC device in the IC design layout are length and width of the channel. Thus, modification to the IC design layout is directly associated with the changes to the electrical performance. Tuning of the IC design layout can then be directly targeted to the electrical performance. A commercial simulation tool, such as SPICE, may be used for this purpose. As described above, the channel contour can be simplified to a rectangle, referred to as an effective rectangle. Further, the simulation results for various effective rectangles of the channel can be expressed in one or more tables (eOPC or ePatterning tables) so that these parameters can be determined by looking up the ePatterning tables. In this process, an interpolation procedure may be used to determine the corresponding electrical parameters.

Exemplary geometrical changes determined at block 404B include $dW_s$ and $dL_s$, representing changes to the channel width and length, respectively. The electrical parameters include saturation current $I_{sat}$, and associated change in saturation current change $dI_{sat}$. Other electrical parameters can include leakage current $I_{off}$, threshold voltage $V_{th}$, other suitable electrical parameters, and/or combinations thereof. Accordingly, the electrical parameter changes include $dI_{off}$, $dV_{th}$, other suitable electrical parameter changes, and/or combinations thereof. The electrical parameters can be considered as constraints applied to the IC design layout. In order for a manufactured device to meet the constraints, the electrical parameters, such as the saturation current $I_{sat}$, are tuned by changing the geometrical parameters, such as the width W and the length L. The geometrical parameters, electrical parameters, and the relationship therebetween can be determined by the simulation. Thus, the geometrical parameters are associated with the electrical parameters. A change to the geometrical parameter is associated with a change to the electrical parameter or changes to more electrical parameters. These associations can be represented in the ePatterning tables and can be extracted from the ePatterning tables. Based on the specification of the device, the necessary changes to the electrical parameters can be determined from the ePatterning tables and then the changes to the geometrical parameters are determined from the ePatterning tables.

At block 404C, ePatterning 406 applies these changes dWs and dLs to the channel defined in the IC design layout. The IC design layout is thereby optimized for the electrical performance. This optimization may be checked at block 404D, where ePatterning 406 checks whether the above described ePatterning is iterated. For example, an electrical parameter, such as saturation current, is checked to see if it is in the range defined in the production specification. Alternatively or additionally, other electrical parameters, such as leakage current and threshold voltage, are checked to see if they are in the specification ranges. If the electrical parameter is not within the specified range, then more iterations are necessary and blocks 404A, 404B, 404C are iterated to further tune the IC design layout until the production specification is met. If the electrical parameter is within the specified range, no further iterations are necessary, and the method 100 can proceed to further processing.

In the present embodiment, the method 400 proceed to block 408, where a design rule check (DRC) is applied to the IC design layout. The DRC technique is a rule based modification applied to the IC design layout. Design rules can be extracted from the ePatterning 406. For example, the change to the width and length of the channel can be determined by the ePatterning 406 and applied to the IC design layout at DRC 408. In the present embodiment, the DRC technique performs ePatterning modifications/features integrated in the regular DRC step. Alternatively, it is understood that block 404 and 406 may be reversed, where the ePatterning technique 405 determines ePatterning modifications/features, and then the logic operation may perform the ePatterning modifications/features in the regular logic operation step.

At block 410, a re-targeting process is performed for model correction to the IC design layout. The IC design layout can be re-targeted such that regular OPC features and modifications can be applied to the IC design layout. Re-targeting of the IC design layout includes adding OPC features, repositioning features, and resizing features. Alternatively, the ePatterning features may be incorporated in the IC design layout at this step.

At block 412, model correction is applied to the IC design layout to modify the layout according to a model-based OPC technique. A lithography process is simulated to determine an image of the IC design layout formed on a photosensitive material layer (such as photoresist) on a semiconductor wafer. Alternatively, the lithography process and etching process are simulated to determine the image of the IC design layout formed on a material layer (such as a polysilicon layer) of the semiconductor wafer. Again, ePatterning modifications/features may also be incorporated into the IC design layout at this step additionally or collectively.

At block 414, the modified, optimized design layout is provided in a format accessible by a mask making tool, such as a GDS format. From the optimized design layout, at block 416, fabrication of a mask or a group of masks can be implemented based on the optimized IC design layout. The mask can be formed in various technologies. For example, the mask may be formed using a binary technology. The binary mask includes a transparent substrate (e.g., fused quartz) and an opaque material (e.g., chromium) coated in the opaque regions of the mask. In another example, the mask is formed using a phase shift technology, where various features in the pattern formed on the mask are configured to have proper phase difference to enhance the resolution and imaging quality. In various examples, the phase shift mask can be an attenuated PSM or alternating PSM. Other processing steps may follow after the formation of the mask. In the present embodiment, a semiconductor wafer is fabricated using the mask formed by the above method.

Figure 5:
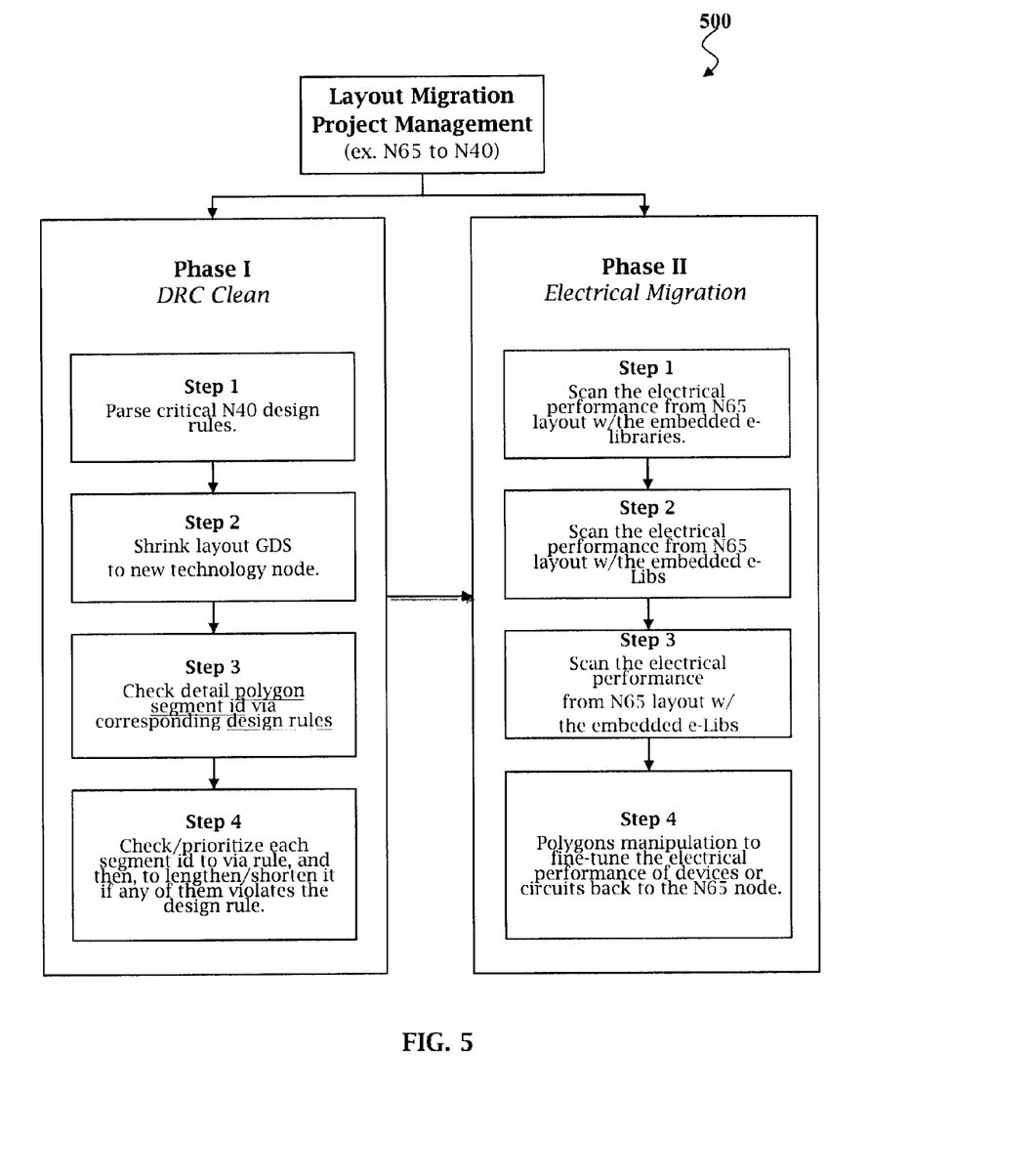
FIG. 5 is a flowchart of an embodiment of an integrated circuit (IC) design method according to aspects of the present disclosure.

FIG. 5 is a flowchart of a method 500 for IC design constructed according to aspects of the present disclosure. The layout migration flow 500 can ensure that performance of the migrated technology node (e.g., 65 nm technology node) device matches the performance of the original technology node (e.g., 90 nm technology node) device. More particularly, the optimization method 500 ensures that the performance of a block in the migrated technology node performs substantially the same as an identical block in the original technology node device. Aspects of the method 500 are similar to methods described herein, yet the method 500 separates layout migration into two phases—a Phase I, which implements a DRC clean, and a Phase II, which implements an electrical migration process. The steps of Phase I and Phase II are described herein. It is understood that additional steps can be provided before, during, and after the method 500, and some of the steps described below can be replaced or eliminated for additional embodiments of the method 500.

The present disclosure can take the form of an entirely hardware embodiment, an entirely software embodiment, or an embodiment containing both hardware and software elements. Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit (IC) design method comprising:
    providing an IC design layout of a circuit in a first technology node;
    migrating the IC design layout of the circuit to a second technology node, wherein migrating the IC design layout comprises shrinking, gridding, and compacting the IC design layout;
    determining an electrical patterning (e-Patterning) modification according to:
        an electrical parameter of the circuit,
        manufacturing data from processing modules in a semiconductor manufacturer, and
        electrical parameters defined in a production specification;
    applying the electrical patterning (e-Patterning) modification to the migrated IC design layout, wherein applying the electrical patterning (e-Patterning) modification is carried out by a computer programmed to apply the modification; and
    thereafter fabricating a mask according to the migrated IC design layout of the circuit in the second technology node.

2. The method of claim 1 wherein applying the e-Patterning modification comprises having a semiconductor manufacturer perform the e-Patterning modification.

3. The method of claim 1 wherein determining an electrical patterning (e-Patterning) modification is performed further according to an optical parameter of the circuit.

4. The method of claim 1 wherein applying the e-Patterning modification comprises implementing an e-Patterning table/library.

5. The method of claim 4 wherein implementing the e-Patterning table/library comprises associating a geometrical dimension of a feature defined in the migrated IC design layout with the electrical parameter of the circuit.

6. The method of claim 1 wherein applying the e-Patterning modification comprises implementing an e-Patterning equation.

7. The method of claim 1 wherein applying the e-Patterning modification comprises implementing at least one of a model-based process and a rule-based process.

8. The method of claim 1 further comprising applying a logic operation process and design rule check (DRC) process to the migrated IC design layout.

9. A method comprising:
    receiving a first integrated circuit (IC) design layout of a circuit in a first technology node;
    receiving an electrical parameter of the circuit manufactured according to the first IC design layout;
    receiving manufacturing data from a processing module for a semiconductor manufacturer;
    migrating the first IC design layout to a second IC design layout in a second technology node; and
    modifying the second IC design layout according to the electrical parameter and the manufacturing data, wherein the modifying of the second IC design layout is performed using a computer, and wherein the modifying of the second IC design layout includes reducing an electrical performance deviation between the first IC design layout in the first technology node and the second IC design layout in the second technology node.

10. The method of claim 9, wherein modifying the second IC design layout further includes implementing at least one of a model-based ePatterning process and a rule-based ePatterning process.

11. The method of claim 9, wherein receiving the electrical parameter of the circuit manufactured according to the first IC design layout comprises:
    extracting characteristics of the first IC design layout; and
    determining the electrical parameter from the characteristics.

12. The method of claim 9, further comprising modifying the second IC design layout by performing iteration and correlation processes for adding an OPC feature.

13. The method of claim 9, wherein modifying the second IC design layout further includes implementing a table that associates a geometrical parameter of a device feature with the electrical parameter.

14. The method of claim 9,
    wherein the second IC design layout includes a device feature; and
    wherein modifying the second IC design layout further includes modifying a geometrical parameter, including at least one of adding an assistant feature to the device feature, repositioning the device feature, resizing the device feature, and combinations thereof.

15. A method of utilizing an IC design layout computing system comprising:
    receiving a first IC design layout of a circuit in a first technology node;
    receiving a first electrical parameter of the circuit manufactured according to the first IC design layout;
    receiving a second electrical parameter defined in a production specification;
    migrating the first IC design layout to a second IC design layout in a second technology node;
    modifying the second IC design layout according to the first and second electrical parameters using the IC design layout computing system, wherein the modifying of the second IC design layout includes reducing an electrical performance deviation between the first IC design layout and the second IC design layout; and
    providing the modified second IC design layout to a mask making facility.

16. The method of claim 15, wherein migrating the first IC design layout comprises shrinking, gridding, and compacting the first IC design layout to produce the second IC design layout in the second technology node.

17. The method of claim 15, wherein modifying the second IC design layout further includes implementing an e-Patterning table/library configured to reduce an electrical performance deviation between the first technology node and the second technology node.

18. The method of claim 15, wherein modifying the second IC design layout further includes implementing an e-Patterning equation configured to reduce an electrical performance deviation between the first technology node and the second technology node.

19. The method of claim 15,
wherein the second IC design layout includes a device feature; and
wherein modifying the second IC design layout further includes modifying a geometrical parameter, including at least one of adding an assistant feature to the device feature, repositioning the device feature, resizing the device feature, and combinations thereof.

20. The method of claim 15, wherein modifying the second IC design layout further includes:
applying an optical patterning correction modification to the second IC design layout; and
applying an electrical patterning (e-Patterning) modification configured to reduce an electrical performance deviation between the first technology node and the second technology node to the second IC design layout.

* * * * *